Figure 1:
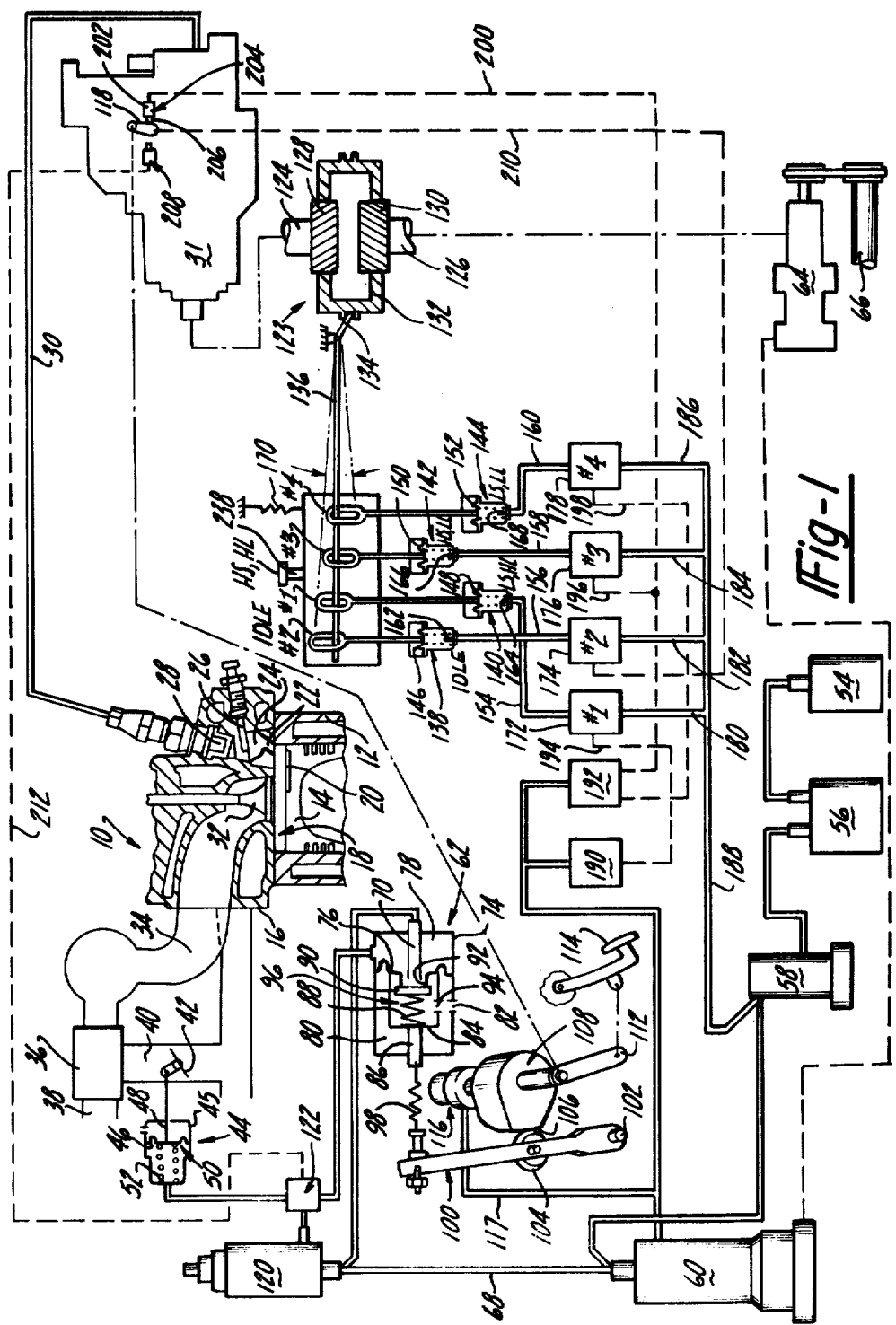

United States Patent [19]

Wade

[11] Patent Number: 4,479,473
[45] Date of Patent: Oct. 30, 1984

[54] DIESEL ENGINE EMISSION CONTROL SYSTEM

[75] Inventor: Wallace R. Wade, Farmington Hills, Mich.

[73] Assignee: Ford Motor Company, Dearborn, Mich.

[21] Appl. No.: 465,857

[22] PCT Filed: Jan. 10, 1983

[86] PCT No.: PCT/US83/00028

§ 371 Date: Jan. 10, 1983

§ 102(e) Date: Jan. 10, 1983

[87] PCT Pub. No.: WO84/02746

PCT Pub. Date: Jul. 19, 1984

[51] Int. Cl.³ .............................................. F02P 5/04
[52] U.S. Cl. .................................. 123/341; 123/501; 123/502; 123/569
[58] Field of Search .............. 123/501, 502, 568, 569, 123/382, 369, 341

[56] References Cited

U.S. PATENT DOCUMENTS

| | | | |
|---|---|---|---|
| 2,270,410 | 1/1942 | Camner | 123/382 |
| 3,015,326 | 1/1962 | Wirsching et al. | 123/340 |
| 3,146,770 | 9/1964 | Garcea | 123/369 |
| 3,401,679 | 9/1968 | McDowell et al. | 123/502 |
| 3,485,223 | 12/1969 | Kaibara et al. | 123/369 |
| 3,636,934 | 1/1972 | Nakajima et al. | 123/571 |
| 3,791,360 | 2/1974 | Rieger | 123/571 |
| 3,815,564 | 6/1974 | Suda et al. | 123/501 |
| 3,842,814 | 10/1974 | Bier | 123/568 |
| 3,915,134 | 10/1975 | Young et al. | 123/571 |
| 3,916,857 | 11/1975 | Naito et al. | 123/571 |
| 3,970,065 | 7/1976 | Kaibara et al. | 123/369 |
| 4,020,809 | 5/1977 | Kern et al. | 123/569 |
| 4,040,402 | 8/1977 | Nohira et al. | 123/571 |
| 4,105,001 | 8/1978 | Hartel | 123/568 |
| 4,228,773 | 10/1980 | Stumpp et al. | 123/568 |
| 4,240,395 | 12/1980 | Simko et al. | 123/568 |
| 4,248,193 | 2/1981 | Choma et al. | 123/568 |
| 4,280,470 | 7/1981 | Ueda | 123/569 |
| 4,290,404 | 9/1981 | Hata et al. | 123/568 |

OTHER PUBLICATIONS

SAE Report No. 800335, Wade, Light Duty Diesel, Apr. 1980, p. 260.
Mechanical Design and Power Transmission, Feb. 15, 1971, p. 62.

Primary Examiner—Magdalen Y. C. Moy
Attorney, Agent, or Firm—Robert E. McCollum; Clifford L. Sadler

[57] ABSTRACT

A vacuum-mechanical system for controlling emissions from a diesel engine by controlling exhaust gas recirculation (EGR) levels and modulating the fuel injection pump timing to coordinate the two; the system including a three-dimensional cam responsive to changes in engine speed and load and fuel delivery to vary the angular position of the EGR valve and simultaneously modulate the injection timing.

20 Claims, 6 Drawing Figures

DIESEL ENGINE EMISSION CONTROL SYSTEM

This invention relates to a system for controlling emissions from a diesel engine by both recirculating engine exhaust gases and simultaneously modulating the fuel injection timing.

The simultaneous control of unburned hydrocarbons (HC), carbon monoxide (CO), and oxides of nitrogen (NOx) in a diesel engine requires a precise control of exhaust gas recirculation (EGR) and injection timing. NOx control can be obtained by the use of EGR to reduce the oxygen concentration in the combustion chamber. However, the amount than can be used is limited both by the breathing capacity of the engine and the percentage of air in the charge that is available for combustion. An adequate amount of excess air must be maintained for a smoke-free combustion. If the EGR rate has been limited by the breathing capacity of the engine, further NOx reduction can still be obtained by the use of retarded injection timing. At light loads, where the amount of EGR used does not limit the breathing capacity of the engine, the injection timing can be advanced for improved HC control.

This invention, therefore, relates to a diesel engine control system that will automatically schedule EGR and injection timing in a manner to provide an optimum control of HC, CO and NOx emissions.

It is another object of this invention to provide a diesel engine vacuum-mechanical emission control system that includes a three-dimensional cam responsive to engine speed and load conditions and fuel injection pump delivery changes to provide a varying schedule of EGR flow, coupled with advancing or retarding the fuel pump injection timing to minimize the output of emissions. Advancing of the injection timing provides a longer resident time permitting a better consumption of the fuel in the combustion chamber. Retarding the injection timing reduces the peak temperature of combustion and thereby reduces the production of NOx.

The control of emissions from a diesel engine by controlling both EGR and fuel injection timing is known. For example, SAE Report No. 800335, April 1980, suggests on page 260 that exhaust gas recirculation and fuel injection timing modulation can significantly affect the emission levels of a swirl chamber Diesel. However, no means are disclosed for accomplishing the desired results.

The use of a three-dimensional cam per se to control fuel flow also is known. For example, the February 15, 1971 edition of Mechanical Design and Power Transmission, on page 62, discloses such a use. In this case, however, the use of a mechanical system was suggested, but no details of a combined system such as are provided by this invention were disclosed.

Other quasi-mechanical systems used to control emissions from an engine also are known. For example, Nakajima et al, U.S. Pat. No. 3,636,934, discloses the use of switches closed or controlled as a function of the position of the carburetor throttle valve and engine or vehicle speeds to control emissions.

Rieger, U.S. Pat. No. 3,791,360, shows an electromagnetically operated EGR valve.

Bier, U.S. Pat. No. 3,842,814, shows the use of a carburetor throttle control valve to control EGR flow.

Young et al, U.S. Pat. No. 3,915,134, discloses an electronic system including a feedback circuit to control EGR flow and minimize smoke in the engine exhaust.

Naito et al, U.S. Pat. No. 3,916,857, discloses a further control for EGR flow as a function of load changes and accelerator lever position.

Kern et al, U.S. Pat. No. 4,020,809, shows merely a diesel engine EGR control system.

Nohira et al, U.S. Pat. No. 4,040,402, discloses an EGR system responsive to various operating conditions of the engine to control the flow.

Wirsching et al U.S. Pat. No. 3,015,326, discloses an arrangement for controlling the injection timing of a fuel injection pump including the use of a three-dimensional cam. However, no control of EGR flow in conjunction with the fuel injection timing is provided.

Garcea, U.S. Pat. No. 3,146,770, also shows the control of fuel injection timing by the use of a three-dimensional cam, without, however, the simultaneous control of EGR flow.

Kaibara et al, U.S. Pat. No. 3,485,223, and U.S. Pat. No. 3,970,065, and Hartel, U.S. Pat. No. 4,105,001, also show the use of three-dimensional cams and mechanical systems for controlling the fuel injection timing; without, however, the inclusion of an EGR control simultaneously operated in conjunction with changes in the fuel injection timing.

Figure 2A:
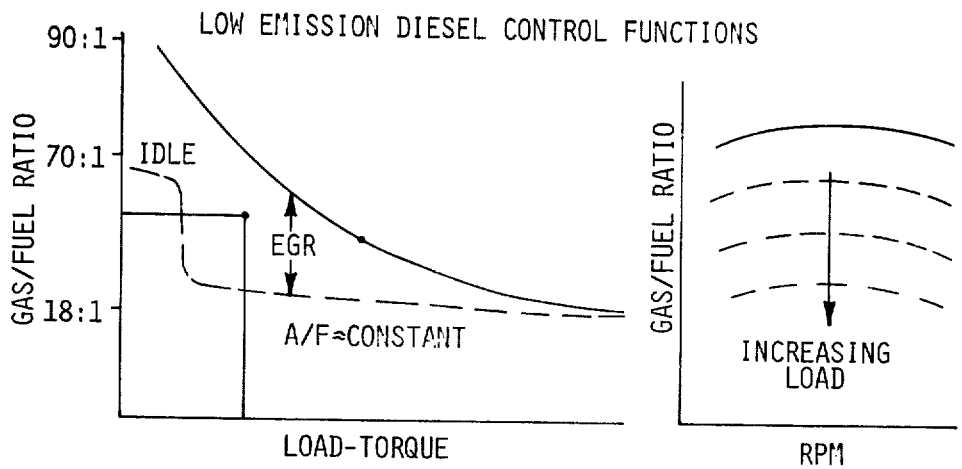
Figure 2B:
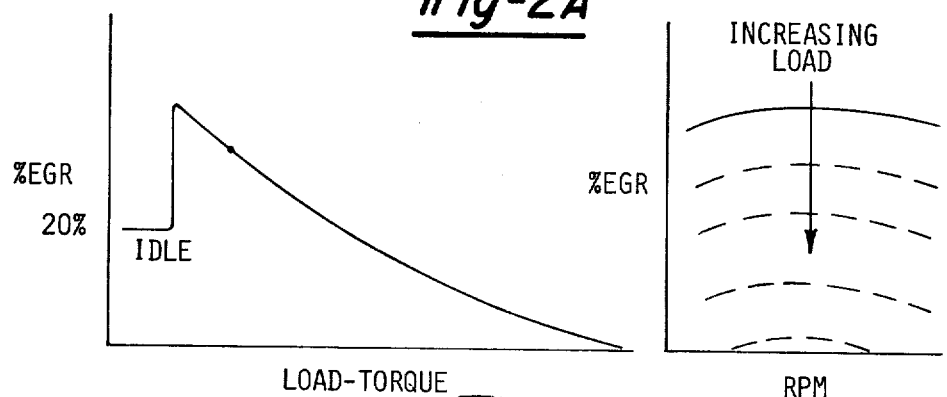
Figure 2C:
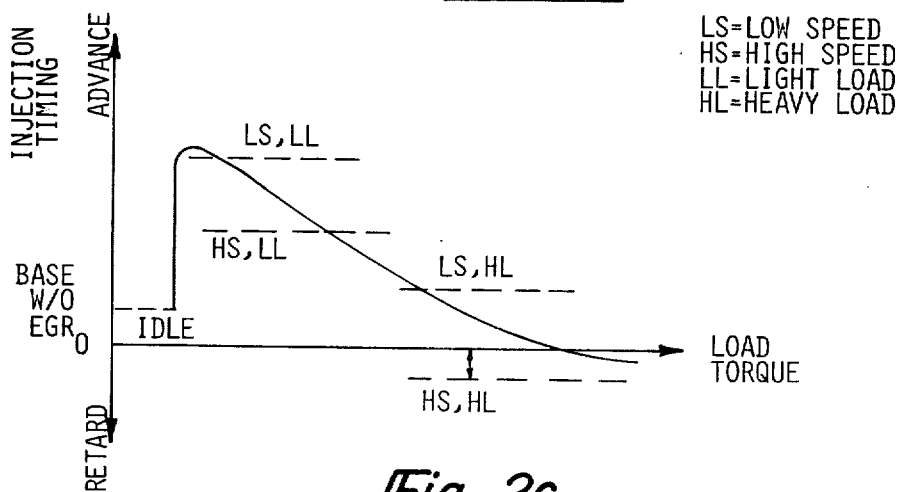
Figure 3:
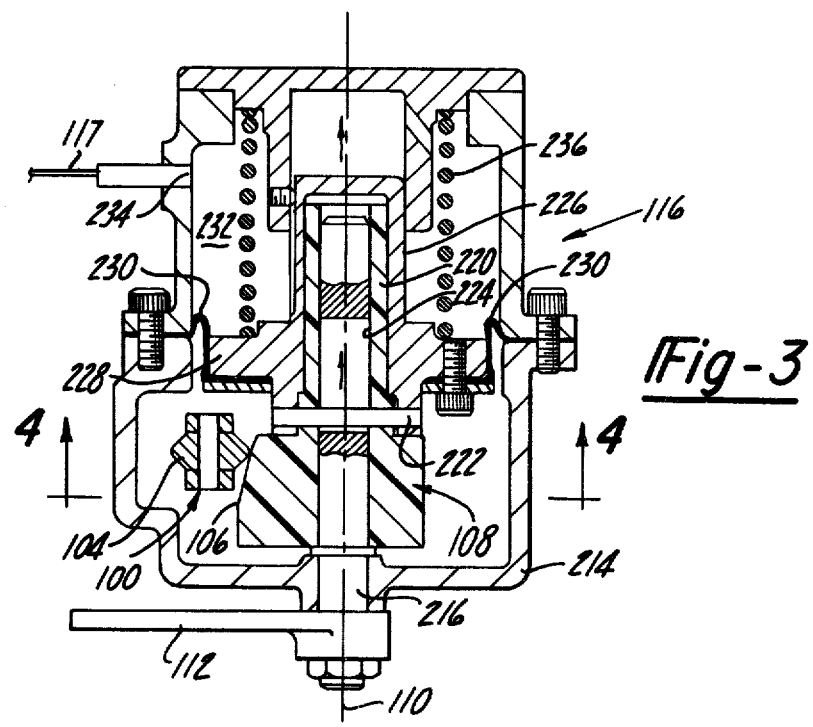
Figure 4:
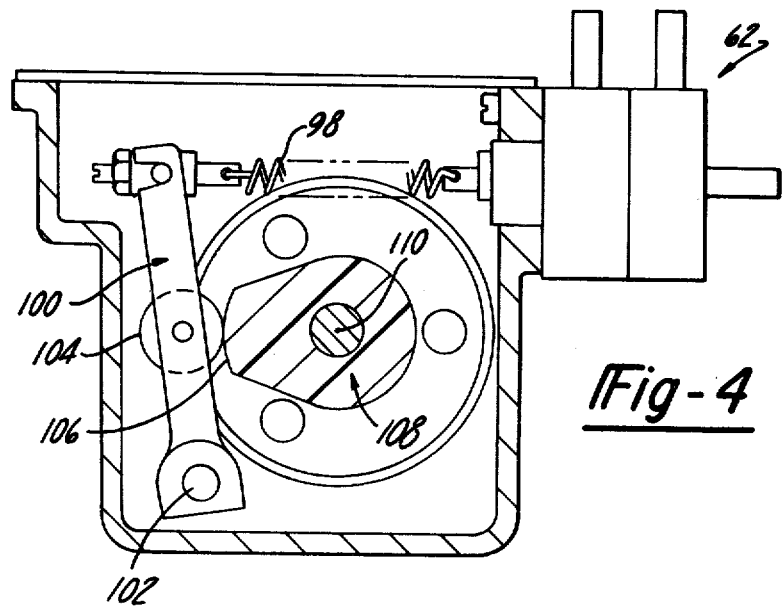

Other objects, features and advantages of the invention will become more apparent upon reference to the succeeding detailed description thereof, and to the drawings illustrating the preferred embodiment thereof; wherein, FIG. 1 schematically represents a control system embodying the invention;

FIGS. 2a, 2b, and 2c graphically represent changes in operation of the engine with changes in the parameters shown;

FIG. 3 is an enlarged cross-sectional view of a detail represented in FIG. 1; and, FIG. 4 is a cross-sectional view taken on a plane indicated by and viewed in the direction of the arrows IV—IV of FIG. 3.

As stated above, the invention provides a system for a diesel engine that controls emissions by automatically regulating exhaust gas recirculation flow as a function of engine accelerator pedal position, engine load and speed, and fuel injection pump delivery; coupled with the simultaneous modulation of the fuel injection pump injection timing schedule complement the changes in EGR flow.

More specifically, FIG. 1 represents schematically a portion 10 of a diesel engine, and a mechanical-vacuum control system for controlling its operation. The engine contains the usual cylinder block 12 within which is slidably mounted a piston 14. The piston together with a cylinder head 16 forms a main combustion chamber 18 connected by a recess 20 in piston 14 and a vortex passage 22 to a prechamber 24. Projecting into chamber 24 is a glow plug 26 and a fuel injection nozzle 28. The latter is supplied with fuel through a line 30 from a fuel injection pump 31.

The engine has the usual intake valve 32 and an exhaust valve (not shown), valve 32 operably controlling the flow of air through an intake passage 34. A mixer 36 combines the intake of fresh air from a passage 38 with the flow of engine exhaust gases in an exhaust gas recirculation (EGR) passage 40. Flow through passage 40 is controlled by a butterfly-type EGR valve illustrated schematically at 42.

Rotation of the EGR valve from the essentially closed position shown to a wide open position is controlled by a vacuum controlled servo 44. The latter is of a known type consisting of a housing 45 divided by an annular flexible diaphragm 46 into an atmospheric air chamber 48 and a vacuum chamber 50. Chamber 50 contains a spring 52 normally biasing diaphragm 46 and EGR valve 42 to a closed position.

The vacuum source for modulating EGR flow in this instance is provided by a vacuum pump indicated schematically at 54. The pump is connected to the EGR servo 44 through a vacuum reservoir 56, a cold engine temperature responsive valve 58, a speed sensitive vacuum regulator 60, and an EGR vacuum regulator unit 62. Vacuum regulator 60 is electrically connected to a tachometer 64 driven from the engine crankshaft 66 to be responsive to changes in engine speed. The regulator 60 is designed to provide an output vacuum varying from zero or a minimum to a maximum as a function of the changes in engine speed and, therefore, provides an output vacuum force to a line 68 that is proportional to engine speed changes.

The output in line 68 is communicated to a stand pipe 70 constituting the input for the EGR vacuum regulator unit 62. This unit consists of a housing 74 divided by an annular flexible diaphragm 76 into a vacuum chamber 78 and an atmospheric air pressure chamber 80. The latter is connected to atmosphere by a vent 82. An essentially U-shaped inner housing or subassembly 84 is fixed for movement with diaphragm 76 and an actuating rod 86. A spring 88 lightly biases a disc valve 90 against the annular inturned edge 92 of the subassembly as shown; or, when diaphragm 76 is moved rightwardly as shown in the figure, seats the valve against the open end of stand pipe 70 to block any flow of vacuum from the same into chamber 78. A second vent 94 connects the inner chamber 96 to atmosphere through vent 82.

A tension spring 98 operates to move the subassembly 84 leftwardly in response to operator demand to move disc valve 90 away from the end of standpipe 70 to communicate vacuum to chamber 78. When the vacuum in chamber 78 rises to a sufficient value, diaphragm 76 will return rightwardly to first seat disc valve 90 against the open end of standpipe 70. Subsequent continued rightward movement of diaphragm 76 will separate the subassembly edge 92 from disc valve 90 to permit the flow of atmospheric air from inner chamber 96 into vacuum chamber 78 to decrease the vacuum level therein until an equilibrium position of the subassembly is provided.

The force of tension spring 98 is determined by the position of a lever 100 (FIG. 4) pivoted at 102. It is arcuately moved in response to changes in engine speed and load and fuel injection pump delivery volume. More specifically, lever 100 is adjustably and pivotably connected at its upper end to tension spring 98. Near its mid point, it supports a roller 104 that operably engages the contoured surface 106 of a three-dimensional cam 108.

The cam 108 is shown more specifically in FIGS. 3 and 4, and its details of construction will be described later. In brief, the rotational axis 110 of cam 108 is fixed, as by means of a lever 112, for rotation with the vehicle accelerator pedal indicated schematically at 114. Depression and/or release of the pedal will provide a corresponding rotation of the cam shaft 110. Cam 108 also is slidably movable or translatable along its axis 110 by a vacuum controlled servo 116 to cam the roller 104 in an axial direction along the circumference of cam 108. The servo 116 is connected by a vacuum line 117 to the speed responsive vacuum regulator 60. As indicated by dot-dash lines in the figure, shaft 110 is also fixedly connected for rotation with the fuel injection pump fuel control lever 118 to provide EGR flow control proportional to fuel delivery. Since fuel delivery is indicative of engine load, the rotational orientation of cam 108, therefore, is indicative of engine load.

The profile of cam 108 can be ground to produce a desired EGR schedule, such as that shown in FIGS. 2a and 2b, for example, by knowing the EGR regulator spring travel versus vacuum force, EGR valve position, and EGR rate relationships. The servo 116 in this case is used to modify the EGR schedule for different engine speeds to accommodate different NOx emission requirements at different engine speeds and changes in volumetric efficiency of the engine.

From the foregoing, it will be seen that the EGR flow schedule will be controlled as a function of the movement of the vehicle accelerator pedal 114 to reflect changes in engine load and speed and fuel injection pump delivery. The output from vacuum regulator 60 will be modulated by means of the EGR regulator 62 to provide a scheduled vacuum force in the EGR vacuum servo 44.

In addition to the controls described, the system also includes a means to preset the EGR flow volume when the engine is idling. This consists of an idle speed EGR vacuum regulator 120 connected in parallel to the vacuum regulator output line 68 and controlled by a three-way solenoid controlled valve 122. As will appear later, when the engine is conditioned for idle speed operation, the three-way solenoid controlled valve 122 will be operated to pass a predetermined vacuum force through the idle EGR vacuum regulator to the EGR servo 44. This will be accomplished by a bleed down of the vacuum signal in line 68 by the vacuum regulator 120 to a predetermined level, bypassing the EGR vacuum regulator unit 62.

The fuel pump injection timing control includes a phase shifter gearset 123 that permits rotation of the fuel pump input shaft 124 in one direction or the other relative to the crankshaft driven shaft 126. The shafts have attached at their adjacent ends oppositely angled helically splined gears 128, 130. The two gears mesh internally with a slider gear 132 that can be moved axially to force relative rotation between the two gears. In so doing, the fuel injection pump injection timing will be advanced or retarded, as the case may be, to work in harmony with the change in EGR flow occasioned by depression or release of the vehicle accelerator pedal.

Slider gear 132 is adapted to be moved by a servo pivoted bell crank-like lever 134, the end of which is engagable in a yoke shaped portion of gear 132. The extended rod-like portion 136 of lever 134 has a lost motion (pin and slot type shown) connection with each of four vacuum operated servos 138, 140, 142 and 144. The rod 136 projects through openings in each of the slotted ends of the servo rods, which are secured respectively to annular flexible diaphragms 146, 148, 150 and 152 in the housings of the servos. Each of the servos is constructed in a manner essentially the same as EGR servo 44 and the details of construction, therefore, will not be repeated. Suffice it to say that each has an individual vacuum input line 154, 156, 158 and 160 to move its diaphragm downwardly against the force of the return spring shown and against a stop indicated at 162, 164, 166, and 168 to provide a predetermined stroke of the servo rod to move control rod 136 downwardly as shown. A spring 170 biases rod 136 upwardly to the initial high speed, heavy load position shown. In this position, the injection timing is conditioned for a retarded timing. It will be seen that the connection of rod 136 to the four servos is in a staggered manner so that successive actuation of the servos will progressively pivot rod 136 downwardly in essentially equal increments. In this case, the successive actuation is scheduled to successively advance the injection timing from the initial retarded setting to provide the desired operation complementary to the changes in the EGR flow.

Flow of vacuum to each individual servo is controlled by a number of solenoid operated vacuum flow control valves 172, 174, 176 and 178. The valves are supplied with vacuum from the reservoir 56 through lines 180, 182, 184 and 186 from a common supply line 188. The vacuum regulator 60 also supplies vacuum to two vacuum opened electrical switches 190, 192 that normally are closed to complete an electrical circuit to certain ones of the solenoids of valves 172–178. At high speeds, the high vacuum opens switches 190 and 192 to break the circuit and deactivate the respective servos, for a purpose to be described.

The solenoid operated valve 172 in this case is electrically connected by a line 194 directly to switch 190 whose electrical contacts are normally closed, as indicated. Solenoid operated control valve 176 is electrically connected by a line 196 through normally closed switch 192 and a line 198 to solenoid operated control valve 178.

Connected in parallel to the solenoids of valves 176 and 178 is an electrical line 200 connected to one contact 202 of a heavy load microswitch 204. Its other contact 206 is attached to a part of the fuel injection pump fuel control lever 118. The microswitch contacts are closed whenever the fuel injection pump control lever is in any position other than a heavy load indicating position. When switch 204 is closed, therefore, electrical energy will be supplied to the solenoids of valves 176 and 178 in addition to the solenoid of valve 172 so long as the vacuum controlled switches 190 and 192 remain closed.

A second idle speed microswitch 208 is attached to the fuel injection pump control lever and closed when the lever is moved to its idle fuel flow setting. This energizes a line 210 connected to the solenoid of valve 174 to open the same and supply vacuum to the idle speed control servo 138. At the same time, because of the low speed and low load, the servo solenoids 140, 142 and 144 also will be actuated. However, because of the lost motion connections to lever 136, only the stroke of the idle speed control servo 138 will be effective to move rod 136 from the initial retarded timing position to an advance position as scheduled.

The idle microswitch 208 also is connected by a line 212 to the three-way solenoid operated valve 122 to simultaneously energize the same and the idle speed vacuum regulator 120 to provide the idle speed vacuum level force that will condition the EGR servo 44 to position the EGR valve 42 in the idle speed position. At this time, reference is made to FIG. 2(c) showing graphically the successive movements of the various servos 138, 140, 142 and 144 controlling the injection timing to provide the scheduled advance or retard of the timing.

As stated previously, FIGS. 3 and 4 show the details of construction of the three-dimensional cam 108 and its servo mechanism 116 for translating the cam along its axis. More specifically, the unit includes an outer housing 124 rotatably receiving a shaft 216 through one end. The outer end of the shaft has fixed on it the lever 112 that is adapted to be connected to the vehicle accelerator pedal and also to the fuel injection pump lever 118 to provide concurrent rotation of all three. Fixed on shaft 216 within the housing 214 is the three-dimensional cam 108 having a sleeve shaft 220 extension axially guided on shaft 216. The cam is nonrotatably but axially slidably secured to shaft 216 by a pin 222 projecting through a slot 224 in the shaft 216. Pin 222 also projects through and is fixed for movement with a second outer sleeve 226 formed with a piston-like flange 228. Flange 228 is secured to an annular flexible diaphragm 230 that defines a vacuum chamber 232 with the remaining portion of the interior of housing 214. The chamber is connected by an inlet 234 to line 117 connected to the vacuum regulator unit 60. A spring 236 normally biases the piston downwardly as seen in FIG. 2 to the initial position shown.

It will be clear that translational or axial movement of cam 108 by servo 116 will cause a radial movement of roller 104 to vary the force of tension spring 98 acting on the vacuum regulator unit 62 to thereby vary the vacuum flow to EGR servo 44 and thereby vary EGR flow into the engine. It will also be clear that rotation of cam 108 to any particular angular position will also cause a radial movement of roller 104 inwardly or outwardly depending upon the contour of the cam to vary the EGR flow by again varying the vacuum force to the EGR servo 44.

Completing the construction, the valve 58 is an on-off temperature responsive valve used to terminate vacuum flow to regulate 60 during cold engine operation. Below a predetermined temperature, valve 58 will be closed so that no vacuum will flow to EGR servo 44 or to the injection timing servos 138, 140, 142 or 144. Accordingly, no EGR will flow, and the injection timing will be retarded, for a cold start and run condition.

The operation of the system is believed to be clear from the above description and a consideration of the drawings and, therefore, will not be repeated in detail. In brief, assume that the engine has been started and is warm enough that valve 58 is open. If the vehicle accelerator pedal is released to its idle speed position, cam 108 and fuel pump control lever 118 will be positioned for the idle speed setting, which will actuate idle speed microswitch 204. This will complete the circuit to the idle speed solenoid controlled valve 174 thereby opening the vacuum valve to apply vacuum to idle speed servo 138. This will pull the phase shifter rod 136 downwardly moving slider gear 132 to change the rotational position of pump shaft 124 relative to the crankshaft 126. The injection timing, therefore, will be changed from the high speed, heavy load, retarded initial position against stop 238 to a slightly advanced idle speed position indicated in FIG. 2(c). Simultaneously, the closing of the idle speed microswitch 204 by lever 118 also completes the electrical circuit to the idle speed EGR vacuum regulator 120 and the three-way solenoid controlled valve 122, thereby providing a predetermined vacuum level force to the EGR servo 44. This will set the EGR valve 42 at the desired angle for idle speed operation.

When the accelerator pedal is depressed for off idle or part throttle operation, cam 108 will rotate to change the tension on the vacuum regulator unit spring 98 to thereby vary the level of vacuum output from this unit to EGR servo 44. Depending upon the speed increase, the cam also will be moved axially to correctly position the EGR valve as a function of speed changes. Depending also upon the load and speed conditions, the solenoid operated valves and switches 140, 142 and 144, and 190 and 192 will be selectively actuated or rendered inactive, as the case may be, to simultaneously adjust the injection timing to correspond to the changes in the EGR flow as determined by the position of cam 108.

From the foregoing, therefore, it will be seen that the invention provides a simplified mechanical-vacuum system for controlling the emission output of a diesel engine by simultaneously controlling EGR flow and modulating the fuel pump injection timing.

While the invention has been shown and described in its preferred embodiment, it will be clear to those skilled in the arts to which it pertains that many changes and modifications may be made thereto without departing from the scope of the invention.

I claim:

1. A mechanical-vacuum system for a diesel engine having an intake manifold, an exhaust manifold for the flow of exhaust gases therethrough, a fuel injection pump operably connected to a vehicle accelerator pedal, the system controlling emissions from the diesel engine by controlling the recirculation of engine exhaust gases into the intake manifold and by modulating the injection timing schedule of the engine fuel injection pump, the system including an exhaust gas recirculation (EGR) system including a spring closed vacuum controlled EGR valve in a passage connecting the engine exhaust and intake manifolds, an EGR valve servo connected to the EGR valve for moving open the EGR valve, an engine driven fuel injection pump providing a fuel output that varies in proportion to engine speed and load, the pump having movable means for varying the fuel injection timing and a movable fuel flow control lever connected to the vehicle accelerator pedal for controlling the pump fuel delivery as a function of accelerator pedal position, a source of vacuum connected to the EGR valve servo to operate the same, vacuum control means to control the flow of vacuum to the EGR valve servo in response to changes in fuel pump flow and engine load and speed, and means responsive to engine speed and load connected to the pump movable means for modulating the pump injection timing concurrent with control of the EGR flow to control the engine emission output.

2. A system as in claim 1, the vacuum control means including a first vacuum regulator 60 providing a vacuum output signal to the EGR valve servo that increases with engine speed, and second vacuum regulator means 62 in series vacuum flow relationship with the first regulator and operably connected to the vehicle accelerator pedal to regulate the vacuum output from the first regulator between a minimum and a maximum as a function of opening movement of the accelerator pedal.

3. A system as in claim 1, the vacuum control means including a vacuum regulator in a vacuum line connection between the vacuum source and the EGR valve servo, and means operably connecting the regulator to the vehicle accelerator pedal for moving the regulator to increase vacuum communication to the EGR valve servo and thereby increase EGR flow in proportion to opening movement of the accelerator pedal.

4. A system as in claim 2, the means operably connecting the regulator means to the pedal including lever and cam means.

5. A system as in claim 4, the cam means comprising a three dimensional cam operably secured to the accelerator pedal for concurrent rotation therewith and having a radially contoured cam surface operably engaging the lever means for reciprocating the lever means linearly to vary the vacuum output from the second regulator means as a function of fuel pump delivery and engine load, the cam also being contoured axially and being axially movable to further vary the linear position of the lever means as a function of engine speed changes, and engine speed responsive means connected to the cam for axially moving the cam.

6. A system as in claim 2, the vacuum control means including an idle speed vacuum regulator operable at engine idle speed levels to automatically limit the vacuum output level from the second regulator means to the EGR valve servo to control the EGR gas flow output level.

7. A system as in claim 6, including switch means including idle speed switch means activated by movement of the fuel pump control lever to an engine idle speed fuel delivery position to activate the idle speed vacuum regulator, the idle speed switch means being deactivated upon movement of the fuel pump control lever beyond the engine idle speed fuel delivery position.

8. A system as in claim 5, the second regulator means including a valve that is spring movable to close the vacuum line to the EGR valve servo, and second spring means operably connecting the latter valve to the lever means for opening the valve in proportion to the force applied to the second spring means by the linear movement of the lever means by the cam.

9. A system as in claim 7, the engine having a crankshaft and a drive shaft for the fuel pump, and including coupling means coupling the engine crankshaft and fuel pump input drive shaft for concurrent rotation, the coupling means including phase shifting means to rotate the pump drive shaft relative to the crankshaft to vary the pump injection timing schedule, and a plurality of vacuum operated speed and load responsive servo means connected to the phase shifting means to rotate the pump drive shaft relative to the crankshaft as a function of changes in engine speed and load conditions.

10. A system as in claim 9, the engine idle speed switch means also operably activating a first one of the servo means to vary the pump injection timing concurrent with varying the flow of EGR gases.

11. A system as in claim 7, the switch means including other light load switch means activated closed by movement of the fuel pump control lever to predetermined positions, the closed position of the latter switch means activating a second one of the servo means to phase shift the pump drive shaft to a different rotative position relative to the crankshaft as a function of the accelerator pedal position control of the EGR flow.

12. A system as in claim 11, the light load switch means being deactivated in response to movement of the accelerator pedal and pump control lever to a predetermined heavy load position to activate a third one of the servo means to phase-shift the pump drive shaft to a further rotative position relative to the crankshaft to change the pump injection timing concurrent with a change in the EGR flow.

13. A system as in claim 12, including speed responsive switch means normally closed below a predetermined engine speed level to activate select ones of the servo means to phase-shift the fuel pump drive shaft in response to activation or deactivation of the light load and idle speed switch means.

14. A system as in claim 12, including lost motion means connecting the servo means to the phase shifter permitting activation of more than one of the servo means at one time while providing movement of the phase shifter by only one of the servo means at any one time.

15. A system as in claim 5, wherein the speed responsive means includes a vacuum controlled servo connected to the output of the first vacuum regulator to axially move the cam as a function of engine speed changes.

16. A system as in claim 15, wherein the vacuum controlled servo connected to the first regulator includes a shaft operably fixed for rotation with the accelerator pedal and fuel pump control lever,
a cam non-rotatably mounted on the shaft with a pin and slot type connection permitting axial sliding of the cam on the shaft,
the cam comprising a sleeve surrounding the shaft and an outer contoured surface engagable with the lever,
the surface tapering in an axial direction to provide points of varying radial extent along its axial length as well as varying radii around its circumference at each axial location,
piston means secured to the cam sleeve and movable in an axial direction in response to the application of vacuum thereto,
and spring means biasing the piston means and cam to an initial position.

17. A system as in claim 9, including spring means biasing the phase shifting means to an initial pump injection timing retarded position.

18. A system as in claim 13, the speed responsive switch means comprising vacuum operated switches having normally closed electrical contacts opened upon the vacuum level reaching predetermined levels to break the electrical connection,
and means connecting the vacuum from the first vacuum regulator to the vacuum operated switches.

19. A system as in claim 9, including a plurality of solenoid operated vacuum control valves selectively controlling the supply of vacuum to the vacuum operated servo means,
and electrical switch means including the idle speed switch means controlled by the movement of the fuel pump flow control lever to activate select ones of the control valves as a function of load positions of the control lever.

20. A system as in claim 19, including further vacuum operated switch means electrically connected to the solenoid operated vacuum control valves to control the energization of the latter as a function of engine speed levels in conjunction with control of the control valves as a function of load changes,
including conduit means connecting the vacuum from the first regulator means to the further control valves,
the latter valves normally having closed electrical contacts opened in response to the attainment of a predetermined vacuum level in response to increase in engine speed.

* * * * *